(12) United States Patent
Maple et al.

(10) Patent No.: US 6,883,122 B2
(45) Date of Patent: Apr. 19, 2005

(54) WRITE PASS ERROR DETECTION

(75) Inventors: Catharine Anne Maple, Bristol (GB); Jonathan Peter Buckingham, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 649 days.

(21) Appl. No.: 09/917,768

(22) Filed: Jul. 31, 2001

(65) Prior Publication Data

US 2003/0028714 A1 Feb. 6, 2003

(51) Int. Cl.⁷ ............................................. G06F 11/00
(52) U.S. Cl. ................................... 714/54; 360/53
(58) Field of Search ............................ 714/54; 360/53

(56) References Cited

U.S. PATENT DOCUMENTS

| 3,641,534 | A |   | 2/1972  | Irwin           |
|-----------|---|---|---------|-----------------|
| 4,390,909 | A |   | 6/1983  | Sakamoto        |
| 4,559,568 | A |   | 12/1985 | Watanabe et al. |
| 4,604,657 | A |   | 8/1986  | Fukami et al.   |
| 4,700,240 | A |   | 10/1987 | Umemoto et al.  |
| 4,829,525 | A |   | 5/1989  | Sugiyama et al. |
| 4,862,443 | A |   | 8/1989  | Tsuji et al.    |
| 5,293,285 | A |   | 3/1994  | Leonhardt et al. |
| 5,339,108 | A |   | 8/1994  | Coleman         |
| 5,353,175 | A |   | 10/1994 | Chiba           |
| 5,369,652 | A |   | 11/1994 | Bailey et al.   |
| 5,371,745 | A |   | 12/1994 | Kiyonaga et al. |
| 5,384,669 | A |   | 1/1995  | Dunn et al.     |
| 5,396,374 | A |   | 3/1995  | Kubota et al.   |
| 5,408,366 | A | * | 4/1995  | Bentley et al. ............... 360/53 |
| 5,416,782 | A |   | 5/1995  | Wells et al.    |
| 5,446,604 | A |   | 8/1995  | Chiba           |
| 5,450,250 | A |   | 9/1995  | Garcia et al.   |
| 5,465,159 | A |   | 11/1995 | Ohashi          |

(Continued)

FOREIGN PATENT DOCUMENTS

| EP | 0286412 A3   | 10/1988 |
| EP | 0831482 A2   | 3/1998  |
| EP | 0913826      | 5/1999  |
| EP | 0936618 A2   | 8/1999  |
| EP | 0957484 A1   | 11/1999 |
| EP | 0984451 A1   | 3/2000  |
| WO | 97/04454     | 2/1997  |
| WO | WO 99/50850  | 10/1999 |

*Primary Examiner*—Robert Beausoliel
*Assistant Examiner*—Michael Maskulinski

(57) ABSTRACT

A data reader is arranged to read data comprising user data 30 and non-user data 32, 34 written across at least two channels of a data-holding medium 10, said data being arranged into a plurality of data items 26 each containing user data and non-user data, with said non-user data holding information relating to said user data, including write pass number information, and data items written across the said channels at the same time being identified as a set of data items, said data reader holding a current write pass number and having a read head 12 for reading a respective said channel of said data-holding medium 10 to generate a data signal comprising said data items, and processing circuitry 258, 280 arranged to receive and process said data signals of a set of data items, including processing said write pass number information of each of said data items in said set, and causing updating of said current write pass number held by said data reader on the basis of the write pass number information of said data items in said set.

13 Claims, 6 Drawing Sheets

U.S. PATENT DOCUMENTS

| | | | |
|---|---|---|---|
| 5,467,360 A | | 11/1995 | Lokhoff |
| 5,485,476 A | | 1/1996 | Paranujape et al. |
| 5,491,590 A | | 2/1996 | Endo et al. |
| 5,499,147 A | * | 3/1996 | Tsai et al. ............ 360/53 |
| 5,543,977 A | | 8/1996 | Shih et al. |
| 5,576,903 A | | 11/1996 | Brown et al. |
| 5,633,855 A | | 5/1997 | Naito |
| 5,675,447 A | | 10/1997 | Goker et al. |
| 5,729,408 A | | 3/1998 | Kikitsu |
| 5,731,922 A | | 3/1998 | Yamasaki et al. |
| 5,818,654 A | | 10/1998 | Reddy et al. |
| 5,844,920 A | | 12/1998 | Zook et al. |
| 5,905,600 A | | 5/1999 | Nieuwkerk |
| 5,940,233 A | | 8/1999 | Malone, Sr. |
| 5,974,581 A | | 10/1999 | Nagai et al. |
| 6,018,434 A | | 1/2000 | Saliba |
| 6,049,654 A | | 4/2000 | Furuta et al. |
| 6,092,231 A | | 7/2000 | Sze |
| 6,282,040 B1 | * | 8/2001 | Bartlett ............ 360/48 |
| 6,288,862 B1 | * | 9/2001 | Baron et al. ............ 360/55 |
| 6,367,047 B1 | | 4/2002 | McAuliffe et al. |
| 6,469,854 B1 | | 10/2002 | Gill et al. |
| 6,473,561 B1 | | 10/2002 | Heo |
| 6,532,128 B1 | | 3/2003 | Bui et al. |
| 6,581,184 B1 | | 6/2003 | Saeki et al. |
| 6,584,527 B1 | | 6/2003 | Verinsky et al. |
| 6,693,755 B1 | | 2/2004 | Maple et al. |
| 6,694,404 B1 | | 2/2004 | Maple et al. |
| 6,792,568 B1 | | 9/2004 | Sved |

* cited by examiner

WRITE PASS ERROR DETECTION

FIELD OF THE INVENTION

This invention provides an improved data storage device, which may be a tape drive arranged to receive data from a computer, or the like. The invention also provides related methods.

BACKGROUND OF THE INVENTION

An example of a data storage device is the tape drive, which receives user data from computers, particularly, but not exclusively to back-up the user data held on the computer onto a data-holding medium. In such back-up applications it is of prime importance that the user data is retrievable, since generally, this copy is the back-up copy that will only be required if the original has been lost or damaged. Therefore, there is an ongoing need to ensure that back-up data storage devices are as robust and secure as possible.

Once user data has been stored on the data-holding medium it can be held there for long periods. To recover the user data from the data-holding medium the data storage device must read the data-holding medium and regenerate the user data originally stored there. In some devices the user data backed-up on the data-holding medium accounts for only about 40% of the overall information held on the data-holding medium. The remaining 60% of the information is non-user data, such as headers or error detection and correction information that attempts to make the user data as secure as possible.

Therefore, in order to read the user data the storage device must accurately detect which is the user data within all of the information held on the data-holding medium. In view of the amount of information other than user data that is held on the data-holding medium, this can be problematic.

The storage device must also be able to detect and correct as many as possible of the errors which may have occurred in writing the user data to the data-holding medium or reading the user data from it, using the error detection and correction information.

The user data is normally split into discrete items, each item including the user data, and non-user data including the error detection and correction information and a header denoting its position in the writing sequence, a write pass number and header error detection information.

The write pass number indicates how many times the data-holding medium has been written to, that is, if it is the fifth time, the write pass number is 5. When writing, the physical separation between the data-holding medium and a write head can vary because, for example, of dirt on the data-holding medium. If the separation is too great, the signal strength is reduced. Data previously written to the data-holding medium is not then erased, and remains on the data-holding medium. Such data is known as a drop-in, and can cause errors when reading the data from the data-holding medium. However, drop-ins can be detected by the write pass number, which is incremented by the data-storage device each time the data-holding medium has been written. A drop-in has a lower write pass number than that of the newer signal which surrounds it, and so can be ignored when reading the data, in order to reduce errors.

When reading, the data storage device holds the write pass number, updating the value as it increases. If data has been written to more than one channel of the data-holding medium, the write pass number changes across all the channels at the same time. It is known in these circumstances for a data storage device to check the write pass number for each data item separately, so that drop-ins can be discarded, and the write pass value updated as it increases. However, this can lead to the write pass value being updated wrongly if a write pass number is in error. Further, if the write pass has in fact changed for all channels, but the first channels read are drop-ins, they may not be detected as such because they do not cause an update of the value.

SUMMARY OF THE INVENTION

It is an object of the present invention to use the write pass number to detect and discard data items which are in error, particularly where the data storage device writes a set of several data items at the same time on different channels.

According to a first aspect of the invention, a data reader is arranged to read data comprising user data and non-user data written across at least two channels of a data-holding medium, said data being arranged into a plurality of data items each containing user data and non-user data, with said non-user data holding information relating to said user data, including write pass number information, and data items written across the said channels at the same time being identified as a set of data items, said data reader holding a current write pass number and having a read head for reading a respective said channel of said data-holding medium to generate a data signal comprising said data items, and processing circuitry arranged to receive and process said data signals of a set of data items, including processing said write pass number information of each of said data items in said set, and causing updating of the current write pass number held by said data reader on the basis of the write pass number information of said data items in said set.

Thus, the data reader updates the current write pass number on the basis of information from a set of data items written at the same time, rather than a single data item, making it less likely to update in error. Further, because the write pass number is updated on the basis of the set of data items, all drop-ins in that set can be discarded following the updating.

Preferably, the write pass number information is contained within a header for each data item, the header including header error detection information, and the processing circuitry processes said header error detection information and said write pass number information for each data item in the set before updating the current write pass number. In this way, the processing circuitry can determine which headers of data items may contain errors, thus determining whether write pass information for any of the data items may be in error, and so can be ignored. This improves the reliability of the updating.

The processing circuitry preferably causes updating of the current write pass number held by the data reader on the basis of the write pass number information of the headers of each data item in the set which are correct.

The circuitry may update the current write pass number if at least a given number of the correct headers agree on it. The number may be chosen to perform more or less rigorous checking. Alternatively, the circuitry may update the current write pass number if there is at least a given number of correct headers and all of those have the same write pass number. (Again, the number can be chosen as required). Other ways of determining updating of the current write pass number may also be used.

Conveniently, the processing circuitry interrupts processing when the write pass number information is such as to cause an update, to enable further processing circuitry to check the write pass number information to confirm the updating.

In a preferred embodiment the data reader has eight read heads, reading eight data channels, although it may have any number of read heads, from two upwards, for example up to sixteen, although any number is possible. The processing circuitry may update the write pass number if say the data items from six channels have the same write pass number.

According to a second aspect of the invention, we provide a data storage device incorporating a data reader according to the first aspect of the invention.

In the preferred embodiment, the data storage device is a tape drive. Such a tape drive may be arranged to read data held in any of the following formats: LTO (Linear Tape Open), DAT (Digital Audio Tape), DLT (Digital Linear Tape), DDS (Digital Data Storage), or any other format, although in the preferred embodiment the tape is LTO format.

Alternatively, the data storage device may be any one of the following: CDROM drive, DVD ROM/RAM drive, magneto optical storage device, hard drive, floppy drive, or any other form of storage device suitable for storing digital data.

According to a third aspect of the invention, we provide a method of reading data comprising user data and non-user data written across at least two channels of a data-holding medium, said data being arranged into a plurality of data items each containing user data and non-user data, with said non-user data holding information relating to said user data, including write pass number information and data items written across the said channels at the same time being identified as a set of data items, said method comprising:

reading each said channel of said data-holding medium;

generating a data signal comprising said data items for each said channel;

processing said data signals of a set of data items including determining a write pass number from said write pass number information of each of said data items in said set; and updating a current write pass number held by a data reader on the basis of said write pass numbers of said data items in said set.

Thus, the current write pass number is updated on the basis of the write pass number information from a set of data items written at the same time rather than a single data item, making it less likely to update in error. Further, because the write pass number is updated on the basis of the set of data items, all drop-ins in that set can be discarded following the updating.

Preferably, where the write pass number information is contained within a header for each data item, with the header including header error detection information, the step of processing the data signals includes processing the header error detection information to determine which of the headers is in error. In this way any headers which are in error (and for which the write pass number may therefore be incorrect) can be ignored in considering the write pass number.

The step of processing the data signals then comprises determining which of the headers of the data items in the set are correct, determining the write pass numbers of those data items and comparing the write pass numbers of the data items with the current write pass number held by the data reader.

The step of comparing the write pass numbers of the data items may include determining how many of the correct headers have the same write pass number, and whether that number of headers exceeds a given number. If so, the write pass number of the data items is compared with the current write pass number to determine whether updating is required.

Alternatively, it may include determining whether there are at least a given number of correct headers, and whether all of those have the same write pass number. If so, the write pass number of the data items is compared with the current write pass number to determine whether updating is required. In either case, the given number may be chosen to perform more or less rigorous checking.

Other methods of comparing the write pass number of the data items may be used.

According to a fourth aspect of the invention there is provided a computer readable medium having stored therein instructions for causing a processing unit to execute the method of the third aspect of the invention.

The computer readable medium, although not limited to, may be any one of the following: a floppy disk, a CDROM, a DVD ROM/RAM, a ZIP™ disk, a magneto optical disc, a hard drive, a transmitted signal (including an internet download, file transfer, etc.).

BRIEF DESCRIPTION OF THE DRAWINGS

An embodiment of the invention is described by way of example only in the accompanying drawings, in which:

Turning to FIG. 1, a tape drive 2 is shown connected to a computing device 4. The computing device 4 may be any device capable of outputting data in the correct format to the tape drive 2, but would typically be a device such as a computer referred to as a PC, an APPLE MAC™, etc. These machines may run a variety of operating systems such as for example MICROSOFT WINDOWS™, UNIX, LINUX, MAC OS™, BEOS™. Generally, because of the high cost of the tape drive 2 it would be connected to a high value computer such as a network server running WINDOWS NT™ or UNIX.

Figure 1:
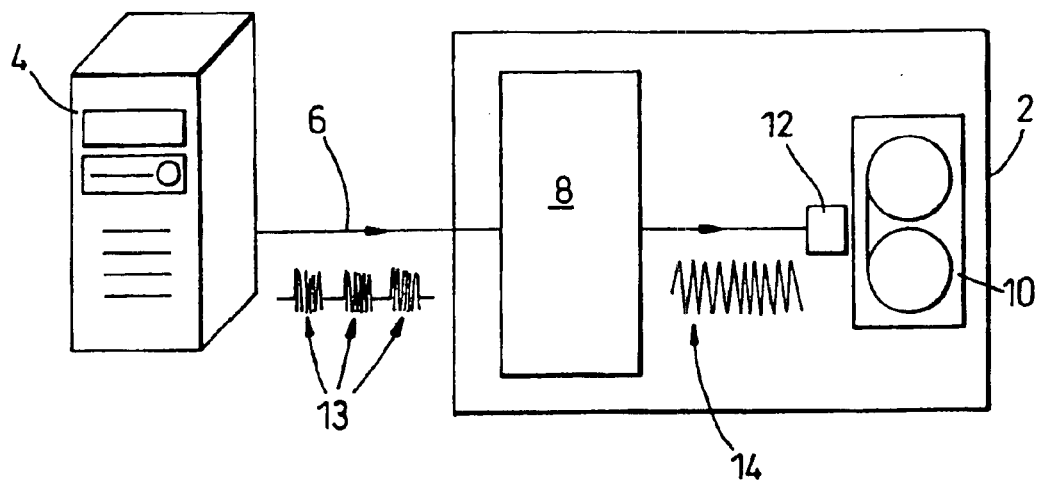
FIG. 1 is a schematic diagram of a computer connected to a tape drive according to the present invention.

A connection 6, in this case a SCSI link, is provided between the computing device 4 and the tape drive 2, which allows data to be transferred between the two devices. The tape drive 2 contains control circuitry 8, which includes a buffer capable of receiving and buffering data received from the computing device 2. A tape 10 has been inserted into the tape drive and is capable of having data written thereto and read therefrom by a set of write and read heads 12. In this embodiment there are eight read and eight write heads. The tape drive corresponds to the LTO format and typically receives tapes having a capacity of the order of 100 Gbytes.

The processing circuitry further comprises memory in which data read from the tape is stored whilst it is being decoded, together with electronics that is arranged to read and decode data from the tape 10.

Data sent by such computing devices is generally sent in bursts, which results in packets of data 13 that need to be smoothed in order that they can be sequentially recorded by the tape drive. Therefore, the buffer within the control circuitry 8 buffers these bursts and allows data to be continuously 14 written to the tape 10.

Figure 2:
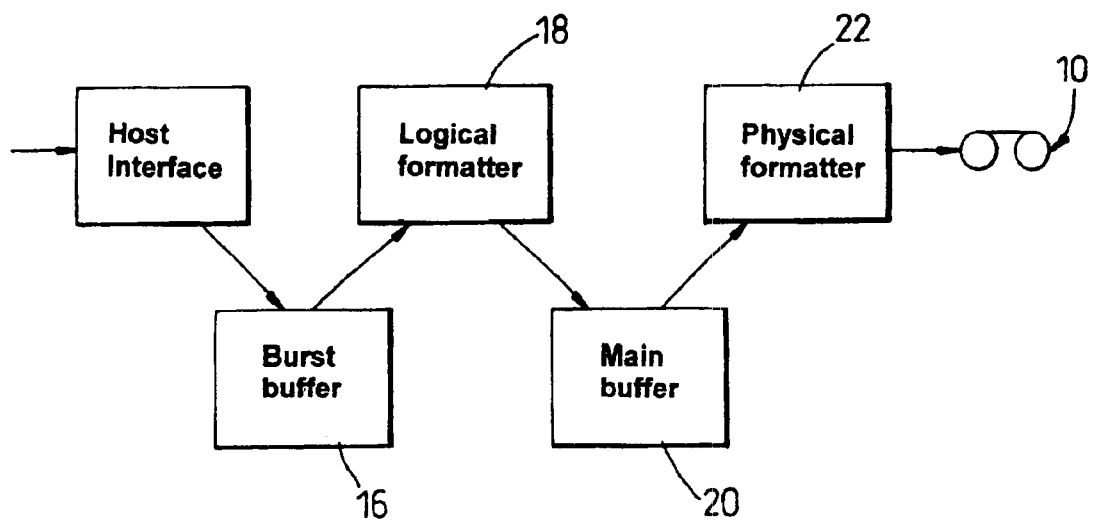
FIG. 2 is a schematic diagram showing the main components of the tape drive of FIG. 1.

The control circuitry is shown in more detail in FIG. 2, which shows a number of portions of the control circuitry 8. The computing device is represented by the left most box of the Figure. The control circuitry 8 comprises a burst buffer 16 that has a capacity of 128 Kbytes and is arranged to receive data from the computing device 4. A logical formatter 18 is provided to perform initial processing of the data received by the burst buffer 16. A main buffer 20 is provided having a capacity of 16 Mbytes and is arranged to hold data that is waiting to be written to the tape 10, and also holds data that is being read from the tape 10 before being sent to the computing device 4. The final block shown in FIG. 2 is the physical formatting block 22, which performs further processing on the data before it can be written to the tape 10, details of which will be given below.

Data received by the tape drive 2 from the computing device 4 is first passed to the burst buffer 16. The burst buffer 16 is required to ensure that the tape drive 2 can receive the high speed bursts of data sent by the computing device 4, which may otherwise be received too rapidly for the logical formatter 18 to process in time. The burst buffer 16 is of a First In First Out (FIFO) nature so that the order of the data is maintained as it is passed to the logical formatter 18.

The logical formatter 18 compresses the data received and arranges it into a first data structure described hereinafter. Once the data has been processed in this manner it is passed to the main buffer 20, also of a FIFO nature, to await further processing before being written to the tape 10. The capacity of the main buffer 20 is much greater than that of the burst buffer 16 so that it can act as a reservoir of information should data be received from the computing device 4 at too great a rate, and can be used to allow writing to continue should data transmission from the computing device 4 be suspended.

The physical formatter 22 handles the writing of the data to the tape, which includes read while writing retries (RWW retries), generation of first and second levels of error correction (C1 and C2), generation of headers, RLL modulation, sync. fields, and provides data recovery algorithms. These terms will be expanded upon hereinafter.

Figure 3:
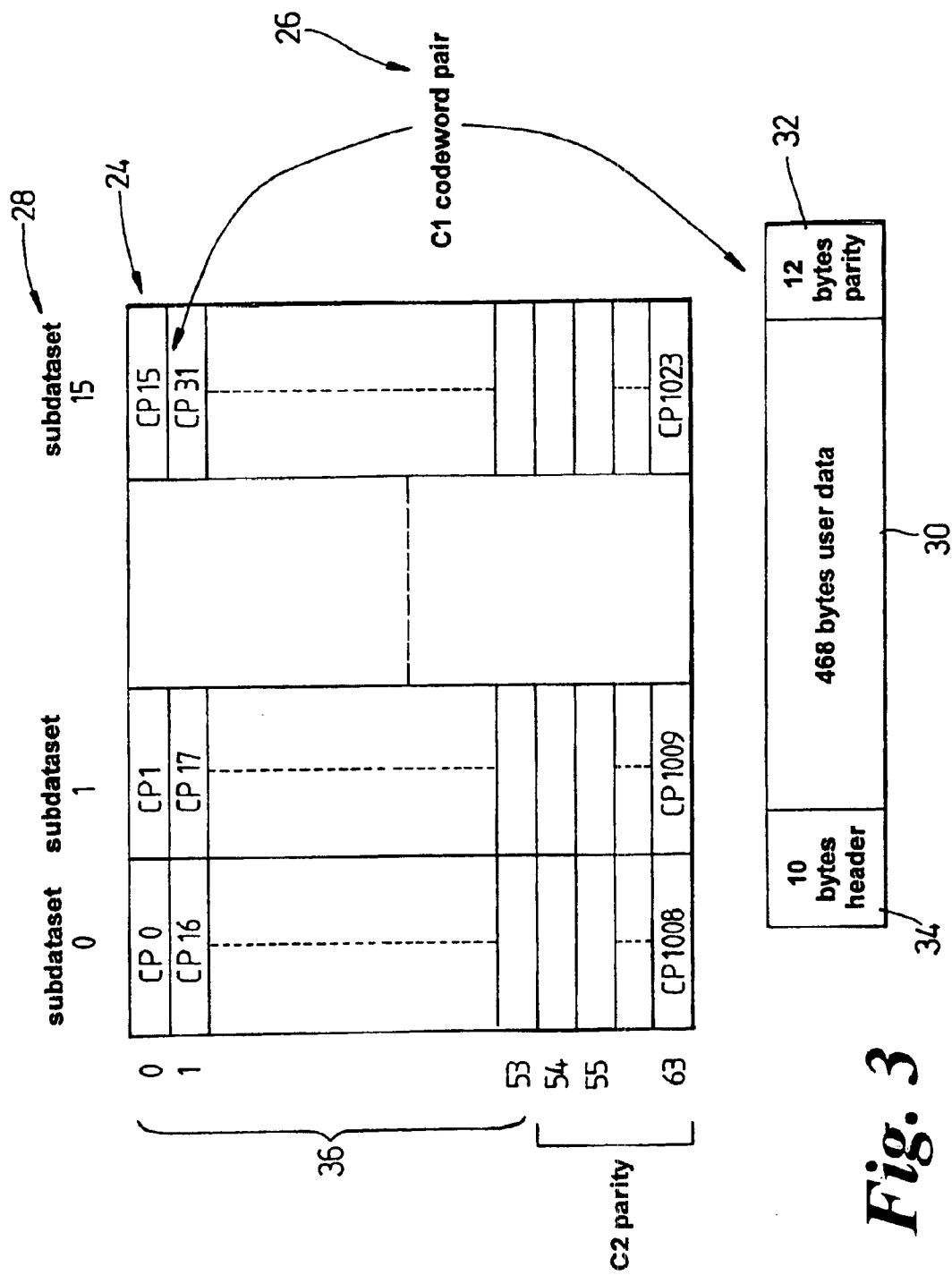
FIG. 3 shows the structure into which data received by the tape drive is arranged.

As written to the tape 10, the data is arranged in a data structure 24, or dataset, as shown in FIG. 3, details of which are as follows. The dataset typically holds 400 Kbytes of compressed data, and comprises a matrix of 64×16 C1 codeword pairs (CCP) 26 and there are therefore 1024 CCPs within a dataset. Each column of the matrix is referred to as a sub-dataset 28, and there are thus 16 sub-datasets within a dataset.

Each CCP, as its name suggests, comprises two code words, each containing 234 bytes of user data, together with 6 bytes of parity information (C1 error correction data), which allows the detection and correction of 3 bytes in error within any CCP. Therefore, each CCP comprises 468 bytes of user data 30 and 12 bytes of parity information 32. The CCP is also headed by a 10 byte header 34.

Rows zero to fifty-three 36 of the dataset 24 hold user data and C1 parity information. Rows fifty-four to sixty-three hold data providing the second level of error correction, C2 parity information.

Figure 4:
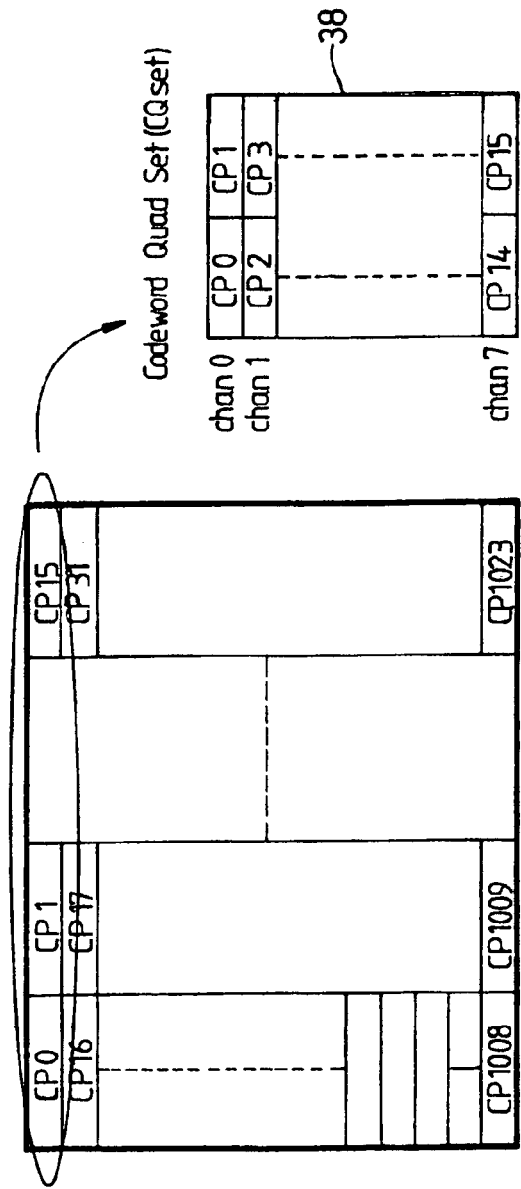
FIG. 4 shows further detail of the data structure of FIG. 3 and how the data is written to the tape.

In general, when the physical formatter 22 writes data to the tape 10 it writes the datasets 24 sequentially, each as a codeword quad set (CQ set) 38, as shown in FIG. 4. This shows that row zero is written first, then row one, up to row 63. Each row is written across all the write heads 12 (channel 0 to channel 7). Each CQ set 38 can be represented as a 2×8 matrix, with each cell of the matrix containing a CCP 26 from the dataset. Each row of the 2×8 matrix is written by a separate write head 12, thus splitting the CQ set 38 across the tape 10.

Figure 5:
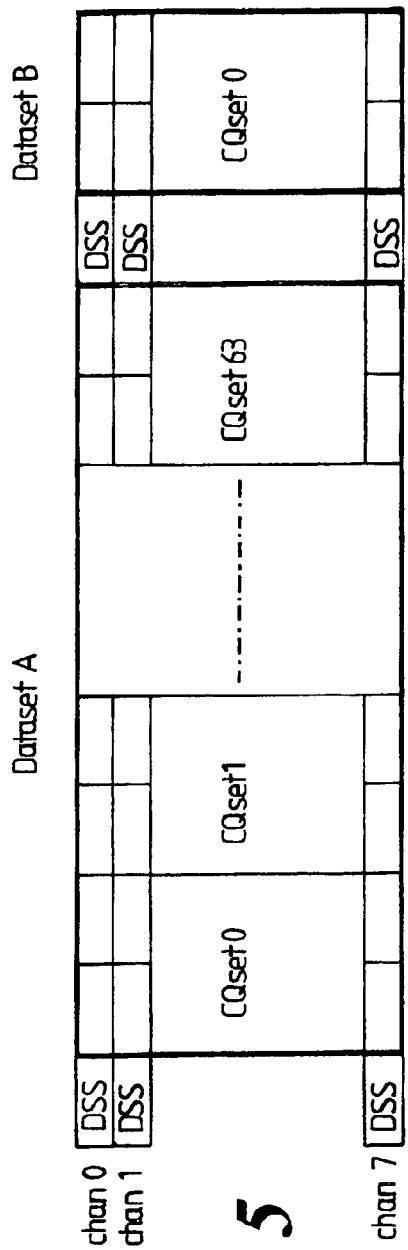
FIG. 5 shows further detail of the data structure of FIGS. 3 and 4, and shows the physical arrangement of the data on the tape.

Thus, the 1024 CCPs 26 from a dataset 24 are written as 64 CQ sets, as shown in FIG. 5. Between each dataset, a dataset separator (DSS) is recorded on the tape 10.

Figure 6:
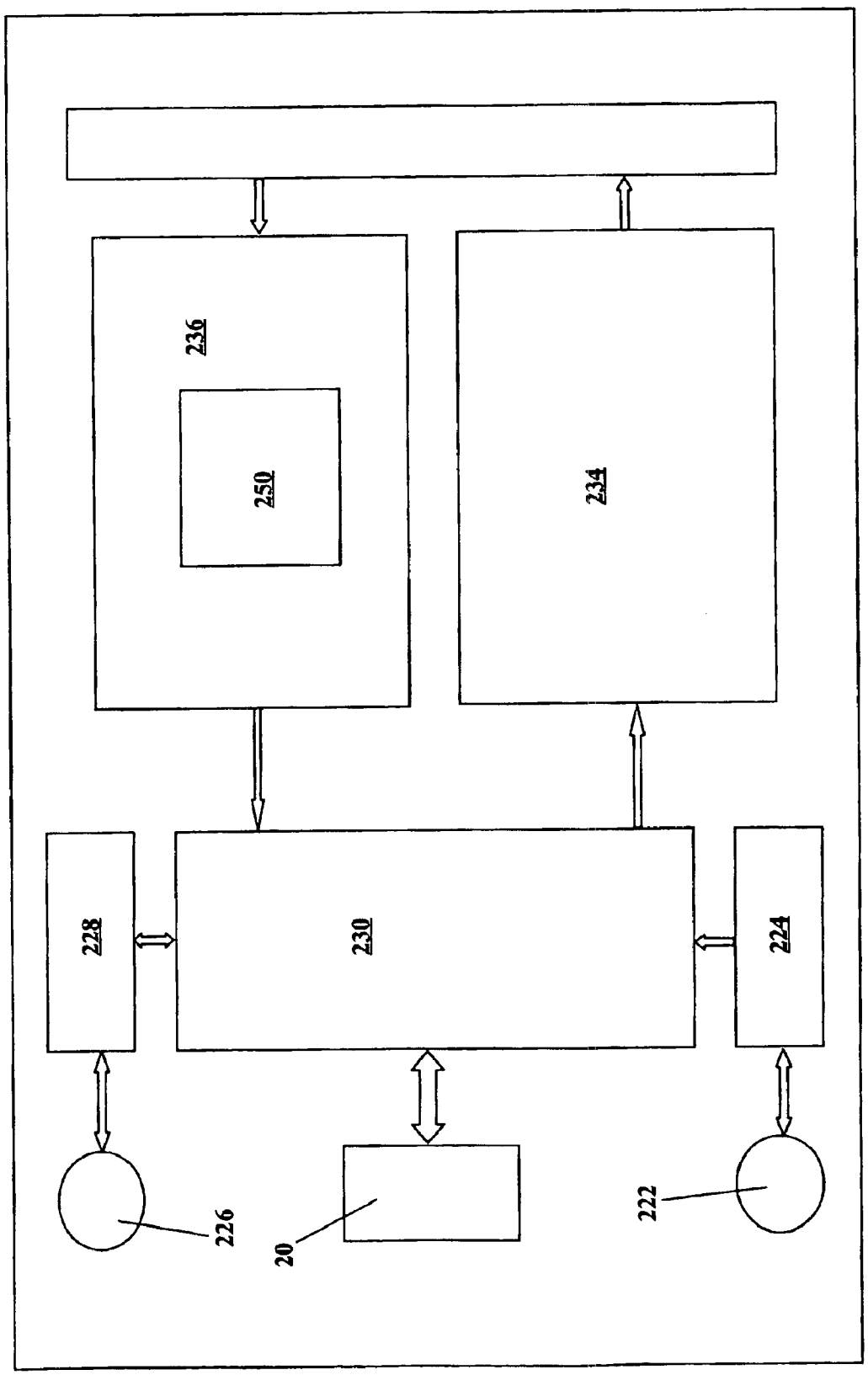
FIG. 6 is a schematic diagram of a formatter for the data.

The operation of the physical formatter 22 is shown in more detail in FIG. 6. The physical formatter 22 comprises the buffer 20, a write controller 222 controlling a write chain controller 224, and a read controller 226 controlling a read chain controller 228. The write chain controller and the read chain controller both interact with a function processing block 230, which generates the C1 and C2 parity bytes, sends data to a CCQ writer 234 for writing onto the tape channels, and receives data read from the tape channels by a CCQ reader 236. The physical formatter 22 is executed as hardware, with the exception of the write controller 222 and the read controller 226, which are firmware.

The write chain controller 224 operates the function block 230 to generate a CCP 26 from the data in the buffer 20, complete write C1 and C2 error correction information. The write chain controller 224 also generates the 10 header bytes 34, which are added by the function block 230.

The CCP 26 is then passed from the function block 230 to the CCQ writer 234, along with further information from the write chain controller 224, including whether it is the first or the second in a CQ set 38, and whether it should be preceded by a dataset separator DSS, and which channel (0 to 7) it should be written to.

The information in the header 34 is critical, and includes a designator of its position in the dataset matrix 24 (a number from 0 to 1023), a dataset number, a write pass number (to be explained in more detail below), an absolute CQ sequence number (all generated by the write chain controller 224), and two Reed Solomon header parity bytes, which are generated by the function block 230. These header parity bytes enable errors in the header 34 to be detected, but not necessarily corrected.

Figure 7:
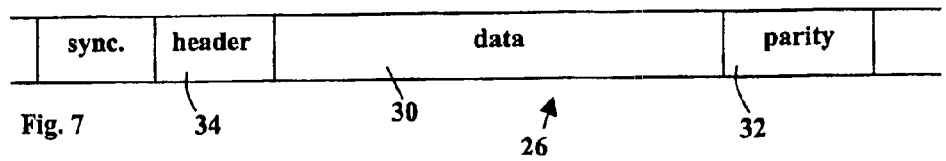
FIG. 7 shows more detail of data as written to tape.

The CCPs 26 passed to the CCQ writer 234 are allocated to a particular channel (0 to 7). Further processing adds synchronisation (sync) fields before each header 34 (see FIG. 7). This enables headers 34 to be recognised more easily when the data is read.

Figure 8:
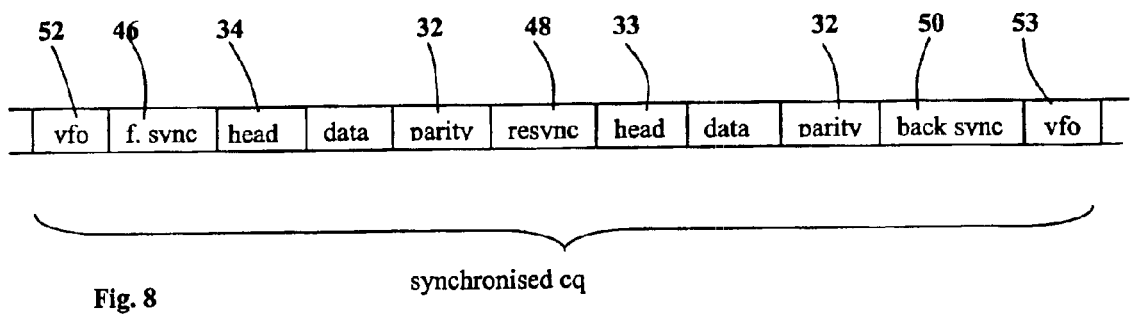
FIG. 8 shows further detail of data as written to tape.

As shown in FIG. 8 three separate sync fields are used: a forward sync 46, a resync 48 and a back sync 50. The forward sync 46 is positioned before the header 34 of the first CCP 26 of a CQ set 38. The resync 48 is positioned between the two CCPs 26 of a CQ set 38 (i.e. after the parity data 32 of the first CCP 26 and before the header 33 of the second CCP 26). The back sync 50 is positioned after the parity data 32 of the second codeword pair 26 within the CQ set 38.

The forward sync 46 is preceded by a VFO field 52 which comprises the data 000010 followed by a number of occurrences of the bit sequence 101010. The back sync field 50 is followed by a VFO field 53 that comprises the data 000010 followed by a number of occurrences of the bit sequence 101010. The VFO field 52 is easily detectable by the processing circuitry reading data from the tape 10, and alerts it to the fact a forward sync field 46 is to follow. The back sync 50 and VFO 53 are used in a similar way when the tape 10 is read backwards. The portion of the tape comprising a forward sync 46 to a back sync 50 comprises a synchronised CQ set 38. The headers 33, 34 contain information as to the identity of the data and the reading of the headers determines how the processing circuitry decodes the data. A DSS is put at the beginning of a dataset.

Figure 9:
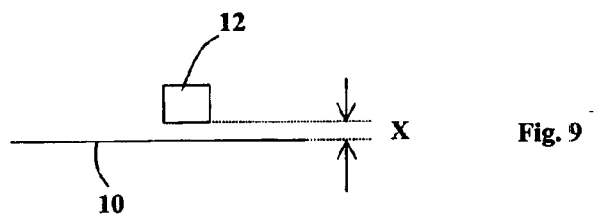
FIG. 9 shows schematically the position of a read head in relation to a tape.
Figure 10A:
FIGS. 10a and b show schematically problems that may occur with a signal being read from a tape.

The dataset is then written to the tape 10 by the eight write heads 12 according to the channels (0 to 7) assigned by the write chain controller. When writing, the write pass number contained in the header 34 is of importance. As can be seen in FIG. 9, when writing data, the physical separation X between the write heads 12 and tape 10 can vary. If the write head 12 moved away from the tape 10 when data was being written (i.e. X increased), then when that data is read back the signal strength at the point corresponding to the increase in X during writing will be much weaker. This is represented in FIG. 10a in which the signal 68 is weakened in the region 70. Such regions are referred to as regions of drop-out. The increased distance X can be caused by a number of factors, including the presence of dirt on the tape 10 and ripples in the tape 10.

Figure 10B:
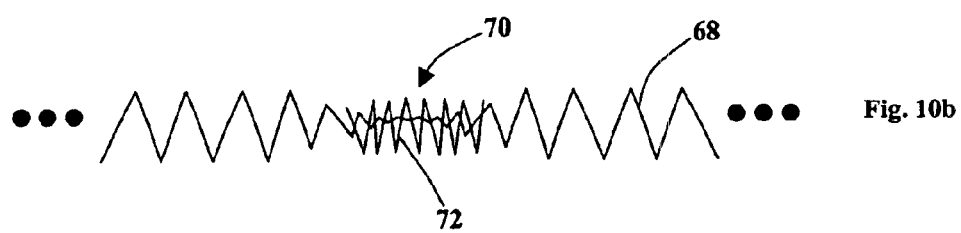

Whilst the tape 10 contains no information then a drop-out region 70 simply results in a loss of signal during reading, and would generate a read while writing retry (as explained below). However, if the tape 10 contained information that was being overwritten then because of the reduced field during writing the existing data would not be erased and would remain on the tape 10 and this is shown in FIG. 10; the new signal 68 is shown with a drop-out region 70 as in FIG. 10a, but an existing signal 72 remains in this drop-out region. This existing signal is referred to a region of drop-in.

Drop-in regions must be accounted for during reading of information from the tape 10, and the write pass number described above is used to achieve this. All data that is written to the tape 10 is written with a write pass number, which for a particular tape is incremented each time data is written thereto. Consequently, a drop-in region of existing signal 72 will have a lower write pass number than the newer signal 68 that surrounds it. If the write pass drops during the middle of a dataset as data is being read from the tape 10, this indicates that a region of drop-in has been encountered. The current write pass number is held in the CCQ reader 236.

The data being written to the tape 10 is also read by the eight read heads. The data read is passed to the CCQ reader 236, where it is processed, as explained below, before being passed to the function block 230 for error detection and correction, and for checking by the read chain controller 228. If the tape drive is in Read While Writing mode, the write chain controller 234 checks the CCPs to determine which CQ sets 38 are in error, and so need rewriting to the tape 10.

If the tape drive is in Reading mode, that is, for restoration of data, the CCPs 26 are passed to the buffer 20 to await sending back to the computer device 4.

The CCQ reader 236 is arranged to detect and in particular to correct errors in the CCP headers 34 before the CCPs 26 are passed to the function block 230. This is advantageous, as it increases the number of CCPs 26 which can be used to recover data; if the header errors cannot be corrected the CCP 26 cannot be used and will require the CQ set to be rewritten (in RWW mode) or the data to be lost (in restoration mode). The CCQ reader 236 also looks at the write pass number of each CCP 26, enabling drop-ins to be filtered out by the CCQ reader 236. This ensures that the CCPs 26 passed to the function block 230 are as error-free as possible.

In general terms, the CCQ reader 236 gets a data signal from all the read heads, each head passing data through a separate channel (0 to 7). The CCQ reader 236 has a processing block 250 which looks for a VFO signal 52, followed by a forward sync 46, so that the header of a CCP 26 can be detected. Once a CCP 26 has been detected, it is processed in the block 250, including for each CCP a write pass check, and a header parity check, to establish any headers 34 that are in error.

The block 250 discards any CCPs 26 that are drop-ins, and corrects the headers 34 if possible. Then CCPs without header errors are multiplexed to the function block 230 for error correction and further processing by the read chain controller.

In order to correct errors in the CCP headers 34, the CCQ reader 236 must identify CCPs 26 which have been written at the same time, as the headers 34 will contain similar information, so that information from the correct headers can be used to interpolate information into the incorrect headers. Because the write heads 12 may not be precisely aligned, CCPs written simultaneously will not arrive at the CCQ reader 236 on all channels simultaneously. It is then necessary to detect which were written at the same time, these being known as a CCP set. Detection of CCP sets can be done by any suitable method.

In accordance with the invention, the CCQ reader 236 performs checks on the write pass number in the header 34 of each CCP in the CCP set, using the processing block 250. The block 250 compares the write pass number for all the CCPs in the set, to enable it to update the write pass number held by the CCQ reader 236. It also filters out CCPs with a write pass number which is less than the current write pass number held by the CCQ reader 236.

Figure 11:
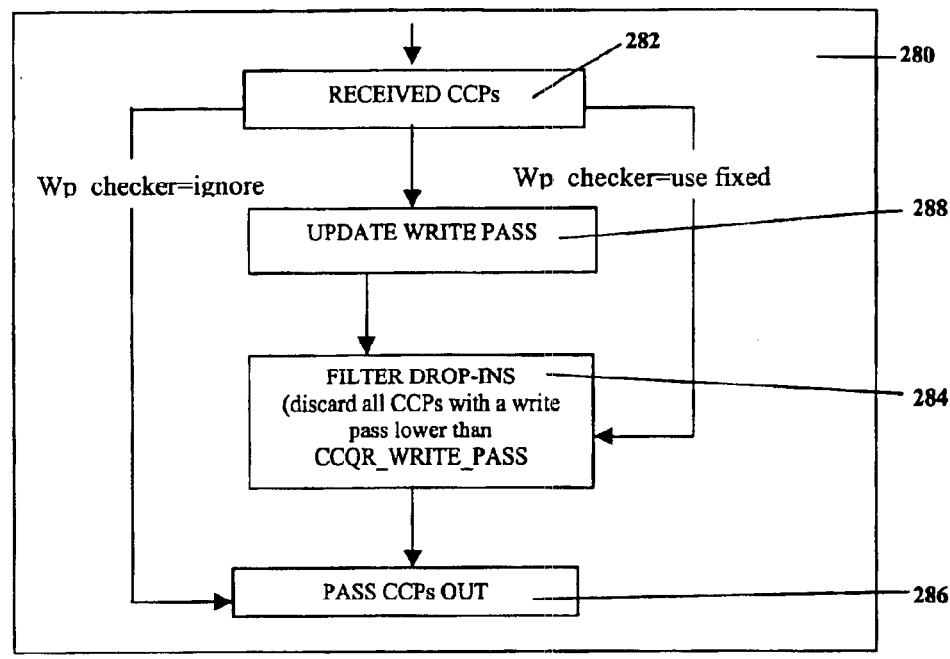
FIG. 11 shows schematically the operation of a hardware block for checking write pass.

The write pass checking is performed by a write pass checker 280 shown in FIG. 11. The checker 280 is part of the processing block 250. As shown in FIG. 11, the CCPs are received by initial block 282, which is configurable to be in ignore, fixed or update mode. Only update mode is relevant to the present invention. In ignore mode (the left hand side of the Figure) no write pass checking is performed at all, and the CCPs are simply passed to the function block 230 by the final block 286. In fixed mode (the right hand side of the Figure) the write pass number of the CCPs is checked in a filter block 284, which discards any with a write pass number lower than the current value held by the CCQ reader 236. The remaining CCPs are passed to the function block 230 by the final block 286.

Figure 12:
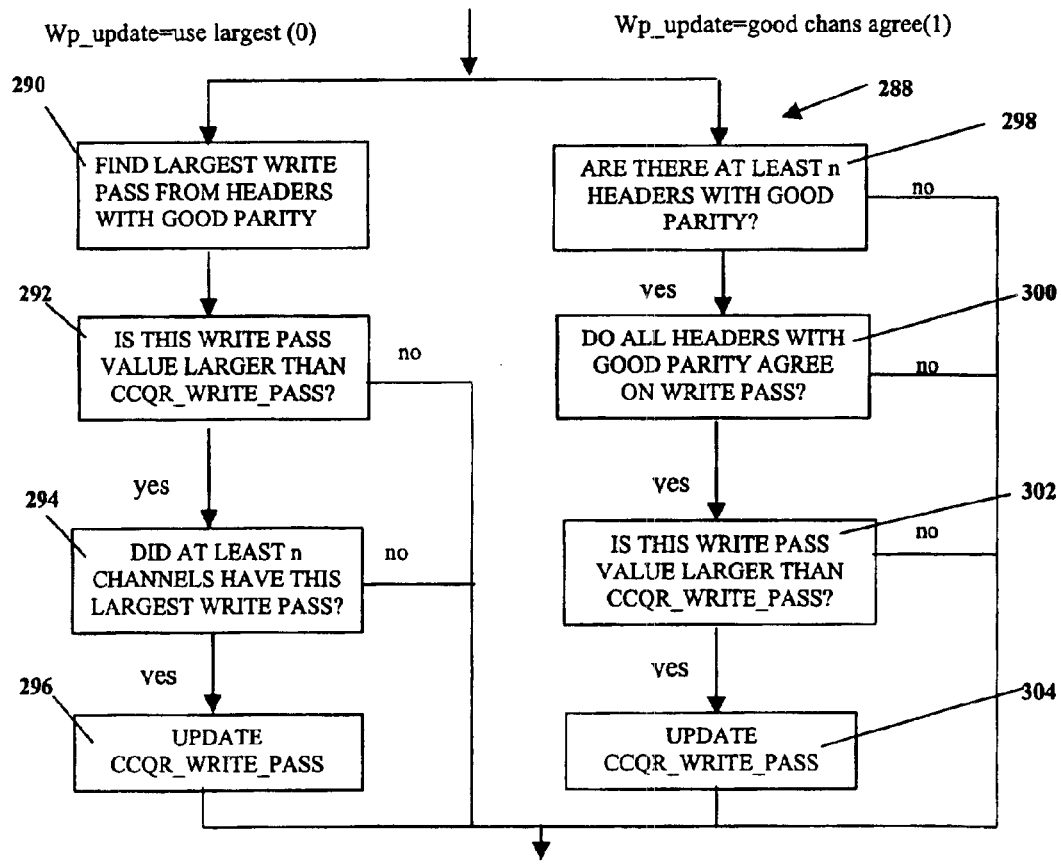
FIG. 12 is an expansion of part of the block of FIG. 11.

In update mode, the CCPs are first passed to an update write pass block 288, shown in more detail in FIG. 12. This shows two different ways of updating the write pass number.

In the method shown on the left hand side of the Figure, the first block 290 looks at the headers 34 of the CCPs in the set which have correct parity, and finds the largest write pass number of those headers. The second block 292 checks whether this write pass number is larger than the current write pass value; if no the write pass block 288 is exited, if yes the third block 294 operates to check whether n channels (0 to 7) have this write pass number, where n is chosen from between 1 and 8. If no, the write pass block 288 is exited, but if yes the fourth block 296 updates the current write pass value held by the CCQ reader 236, and then the block 288 is exited.

In the method shown on the right hand side of FIG. 14, the first block 298 checks whether there are at least n headers with correct parity, where n is chosen from 1 to 8. If no, the block 288 is exited; if yes, the second block 300 checks whether all these headers have the same write pass number. If no, the block 288 is exited; if yes the third block 302 checks whether the write pass number is larger than the current value of the write pass held by the CCQ reader 236. If no, the block 288 is exited; if yes the fourth block 304 updates the write pass number in the CCQ reader 236, and then the block 288 is exited.

Thus, the first method takes all the headers 34 of the CCPs in the set with correct parity, finds the largest write pass number and checks that a given number of headers agree with this before updating.

The second method checks for a given number of headers 34 in the set with correct parity, and checks that they all agree before updating. This method is more rigorous than the first one.

Further, the choice of n in each method makes the method more or less likely to update the write pass. In each method, n is likely to be between 2 and 6; a low value of n makes updating more likely, while a higher value makes updating less likely. The choice of n, which is configurable, enables the method to be tailored to suit the particular data storage device.

It will be appreciated that other methods of deciding on updating could be used. However, any method is likely to look at the headers 34 with correct parity and how many have the same write pass number. In all cases, it is important to ensure that the write pass is not updated wrongly, as this will result in more data being discarded as drop-ins.

In order to guard against wrong updating of the current write pass number in the CCQ reader 236, if the write pass number is changed by the block 288, the CCQ reader 236 generates an interrupt, enabling firmware to check the new value and/or to use a more sophisticated write pass checking method if required.

What is claimed is:

1. A data reader arranged to read user data and non-user data written across at least two channels of a data-holding medium, said data being arranged into a plurality of data items each including user data and non-user data, said non-user data holding information relating to said user data, the information including write pass number information, and data items written across the said channels at the same time being identified as a set of data items, said write pass number information being included in a header for each said data item, said header including header error detection information, said data reader comprising an arrangement for holding a current write pass number, a read head for reading a respective said channel of said data-holding medium and for thereby deriving a data signal having said data items, and processing circuitry arranged to (a) receive and process said data signals of a set of data items, including processing said write pass number information of each of said data items in said set, (b) receive updating of said current write pass number held by said data reader on the basis of the write pass number information of said data items in said set, and (c) process (i) said header error detection information and (ii) said write pass number information for each said data item in said set before updating said current write pass number.

2. A data reader according to claim 1, wherein said processing circuitry is arranged to update said current write pass number held by said data reader on the basis of said write pass number information of said headers of each said data item in said set which are correct.

3. A data reader according to claim 1, wherein said circuitry updates said write pass number if at least a given number of said correct headers agree on it.

4. A data reader according to claim 3, wherein said given number is variable.

5. A data reader according to claim 1, wherein said circuitry updates said write pass number if there is at least a given number of said correct headers and all of those have the same write pass number.

6. A data reader according to claim 1, wherein said processing circuitry is arranged to interrupt processing in response to said write pass number information being such as to cause an update, to enable further processing circuitry to check said write pass number information to confirm the updating.

7. A data storage device incorporating a data reader according to claim 1.

8. A method of reading user data and non-user data written across at least two channels of a data-holding medium, said data being arranged into a plurality of data items each including user data and non-user data, said non-user data holding information relating to said user data, including write pass number information, said write pass number information being included in a header for each said data item, said header including header error detection information, the data items written across the said channels at the same time being identified as a set of data items, said method comprising:

reading each said channel of said data-holding medium;

generating a data signal comprising said data items for each said channel;

processing said data signals of a set of data items, the processing including (a) determining a write pass number from said write pass number information of each of said data items in said set, (b) determining which of said headers is in error by processing said header error detection information; and updating a current write pass number held by a data reader on the basis of said write pass numbers of said data items in said set.

9. A method according to claim 8, wherein said step of processing said data signals comprises determining which of said headers of said data items in said set are correct, determining the write pass numbers of those data items and comparing the write pass numbers of said data items with the current write pass number held by said data reader.

10. A method according to claim 9, wherein said step of comparing the write pass numbers of said data items includes determining how many of said correct headers have the same write pass number, and whether that number of headers exceeds a given number.

11. A method according to claim 10, wherein said write pass number of said data items is compared with said current write pass number to determine whether updating is required.

12. A method according to claim 10, wherein said given number is variable.

13. A method according to claim 9, wherein said step of comparing the write pass numbers of said data items includes determining whether there are at least a given number of correct headers, and whether all of those have the same write pass number.

* * * * *